June 4, 1940.  J. W. ANDERSON  2,203,346
WINDSHIELD WIPER
Filed Feb. 12, 1934
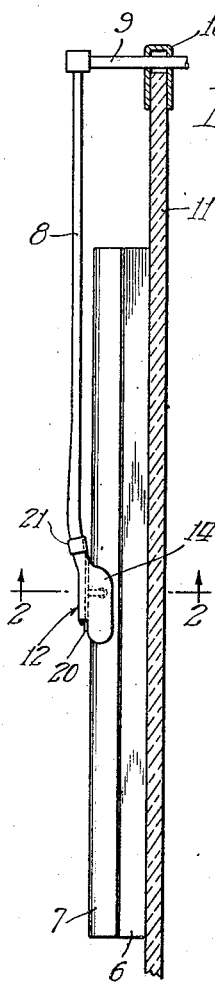
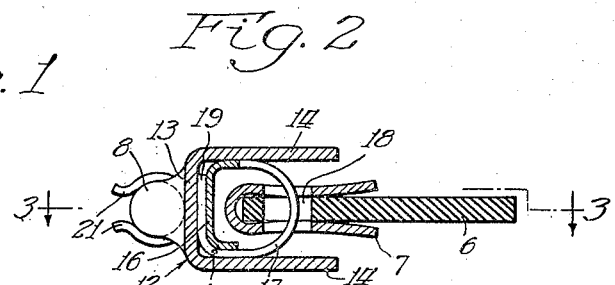
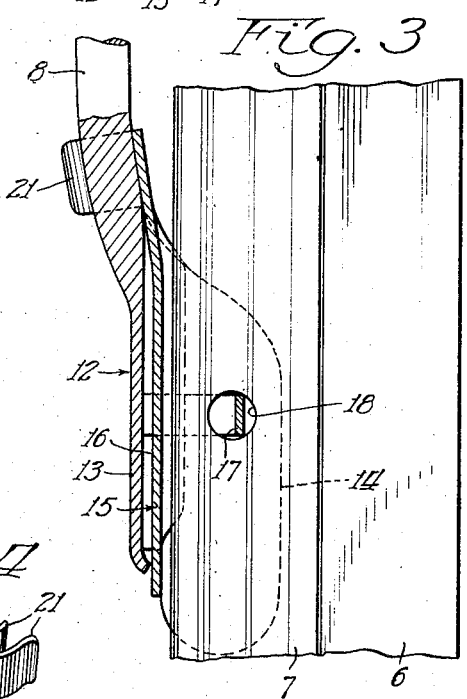
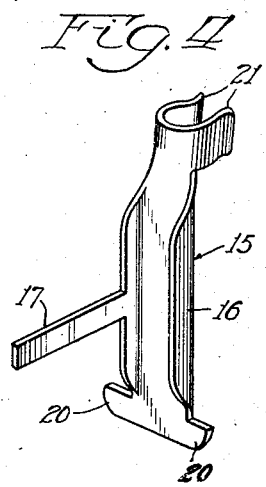
Inventor
John W. Anderson
By: Hill & Hill, Atty.
Witness:
V. Silfander Patented June 4, 1940

2,203,346

UNITED STATES PATENT OFFICE 2,203,346

WINDSHIELD WIPER

John W. Anderson, Gary, Ind., assignor to Productive Inventions, Inc., Gary, Ind., a corporation of Indiana Application February 12, 1934, Serial No. 710,817

12 Claims. (Cl. 15—250)

This invention relates to windshield wipers, and particularly to means for assembling the wiper blade and operating arm therefor in a manner to support the blade in operative position on the arm.

Among other objects, the present invention is intended to provide novel means for connecting the windshield wiping blade or element and support therefor to an operating arm.

Another object of the invention is to provide novel means for mounting the connecting member or clip on the wiping element support in a manner to permit a rocking movement of the support and blade with respect to the clip and operating arm.

Another object of the invention is to provide novel means for mounting the connecting member on the operating arm.

A further object of the invention is to provide a one-piece connecting member adapted to be readily connected to and removed from a wiping element support and the operating arm therefor.

A still further object of the present invention is to improve devices of the character described in sundry details hereinafter referred to and particularly pointed out in the appended claims.

One embodiment of the present invention is shown for illustrative purposes in the accompanying drawing, in which Fig. 1 is an elevational view of a windshield wiper blade and operating arm assembly, showing its application to the windshield of a motor vehicle, or the like, and illustrating an embodiment of the present invention associated therewith;

Fig. 2 is an enlarged transverse sectional view taken substantially as indicated by the line 2—2 of Fig. 1;

Fig. 3 is a longitudinal sectional elevational view taken substantially as indicated by the line 3—3 of Fig. 2; and Fig. 4 is a perspective view of my improved wiper blade support and arm connector.

In the drawing, the present invention is shown in relation to a windshield wiper blade comprising a wiping element 6 and a support 7 therefor operatively connected to a wiper or operating arm 8 shown, in Fig. 1, as operatively connected to a rockshaft 9 mounted to oscillate in a bearing portion 10 of a windshield frame provided for supporting a windshield indicated at 11.

The operating or wiper arm 8, illustrated in the drawing, is provided adjacent its free end with a channel shaped portion indicated as a whole by the numeral 12 and comprising a bottom portion 13 and side walls 14, the outer ends of the side walls being shown, in the present instance, as extending a substantial distance beyond the outer end of the bottom portion 13 of the channel, as clearly shown in Figs. 1 and 3.

For connecting the wiper blade to the arm 8, my improved connector, clearly shown in Fig. 4 and designated as a whole by the numeral 15, comprises a body portion 16 shown, in the present instance, as of substantially U-shaped cross section, and adapted to be positioned in the channel 12 formed at the free end of the arm 8, the connector 15 being provided with a flexible blade-support engaging member or strip 17 shown in the present instance, as formed integrally with one leg portion of the U-shaped body 16 of the connector 15, and adapted to be positioned loosely in an aperture 18 formed in the wiper blade supporting member 7, and to be bent around the body portion 16 of the connector 15 in a manner to occupy a position between the outside of the U-shaped body portion 16 and the bottom 13 of the channel 12 formed on the arm 8, as clearly shown and indicated at 19 in Fig. 2.

For mounting the connector 15 in the channel 12 of the arm 8, and securing it against displacement with respect thereto, the connector 15 is shown, in the present instance, as provided adjacent one of its ends with a pair of oppositely disposed lugs or projections 20 extending laterally therefrom, preferably, in substantially the plane of the bottom of the U-shaped body portion 16 and adapted to engage the free end of the arm 8 and, preferably, the extended end portions of the wide walls 14 of the channel 12, as clearly shown in Figs. 1 and 3, and at its opposite end, the connector 15 is shown as provided with a pair of laterally extending flexible, and preferably resilient, fingers 21 adapted to yieldingly engage the arm 8 at a distance remote from the free end thereof, and intermediate the ends of the arm, as clearly shown in Figs. 1, 2 and 3, it being understood that the connector 15 may be formed from resilient sheet material and, if desired, the temper may be drawn from the member or strip 17 to facilitate its being bent around the connector in the manner shown in Fig. 2.

It will be observed from the foregoing description that the present invention provides a simple inexpensive device by which a wiper blade may be connected to a wiper arm in a manner to effectively maintain the blade and arm in operative relation to each other, and to provide a structure, which may be readily removed from the arm and blade for making replacements of the blade when required, it being necessary, in such an instance, to merely disengage the fingers 21 from the intermediate portion of the arm 8 after which the connector 15 may be removed from the channel 12, member 17 removed from the aperture 18 of the blade support 7 and inserted in a new blade for attachment to the arm 8 in the manner disclosed in Figs. 1, 2 and 3 of the drawing.

Obviously, the present invention is not limited to the precise construction and arrangements shown and described, as the same may be variously modified without departing from the spirit and scope of the invention as set forth in the appended claims.

What I claim as new and desire to secure by Letters Patent is:

1. In a windshield wiper, the combination with a wiper blade having an aperture formed therein, of means for connecting said blade to a wiper arm, said means comprising an elongated connector, a laterally extending flexible strip integral with said connector adapted to be positioned loosely in the aperture of the wiper blade for securing the connector thereto, and transversely extending means integral with said connector adjacent the opposite ends thereof and engageable with different portions of a wiper arm for securing the connector to the arm.

2. In a windshield wiper, the combination with a wiper blade having an aperture formed therein, of means for connecting said blade to a wiper arm having a transversely extending end portion, said means comprising an elongated connector, a laterally extending flexible strip on said connector adapted to be positioned loosely in the aperture of the wiper blade and to be bent upon itself for securing the connector to said blade, oppositely disposed transversely extending projections adjacent one end of said connector and engageable with said end portion of the wiper arm, and a pair of fingers adjacent the opposite end of the connector engageable with opposite sides of the wiper arm at a point remote from the end portion thereof.

3. In a windshield wiper, the combination with a wiper blade having an aperture formed therein, of means for connecting said blade to a wiper arm having side walls, said means comprising an elongated connector having a body portion of substantially U-shaped cross-section, a laterally extending flexible strip on one leg of the U-shaped portion adapted to be bent laterally and positioned loosely in the aperture of the wiper blade, oppositely disposed projections adjacent one end of said connector and extending laterally therefrom and adapted to engage the end portion of said side walls, and resilient fingers adjacent the opposite end of the connector adapted to yieldingly engage opposite sides of said arm intermediate its end portions.

4. In a windshield wiper, the combination with a wiper blade having an aperture formed therein, of means for connecting said blade to a wiper arm having side walls, said means comprising an elongated connector having a body portion of substantially U-shaped cross section, a laterally extending flexible strip on one leg of the U-shaped portion and adapted to be bent and positioned loosely in the aperture of the wiper blade, oppositely disposed projections adjacent one end of said connector and extending laterally therefrom in substantially the plane of the bottom of said U-shaped portion and adapted to engage the end portions of the side walls of the wiper arm, and fingers adjacent the opposite end of the connector and extending substantially transversely to the plane of said projections and adapted to engage opposite sides of said arm intermediate its end portions.

5. In a windshield wiper, the combination with a wiper blade having a lateral aperture formed therein, of means for connecting said blade to a wiper arm having side walls forming a channel adjacent its free end portion, said means comprising a connector positioned in said channel and having an elongated body portion, a flexible strip extending laterally from said body portion and of a length to be positioned in the aperture of the wiper blade and to be bent over the body portion of the connector to occupy a position between said body portion and the bottom of the channel formed at the free end of said wiper arm, means adjacent one end of said body portion engaging the ends of the walls of said channel, and fingers adjacent the opposite end of said body portion engaging a portion of said wiper arm remote from the end thereof.

6. In a windshield wiper, the combination with a wiper blade having a lateral aperture formed therein, of means for connecting said blade to a wiper arm having side walls forming a channel adjacent its free end portion, the ends of the walls of said channel being extended longitudinally beyond the end of the bottom portion thereof, said means comprising a connector positioned in said channel and having an elongated body portion, a flexible strip extending laterally from said body portion and of a length to be positioned loosely in the aperture of the wiper blade and to be bent over the body portion of the connector to occupy a position between said body portion and the bottom of the channel formed at the free end of said wiper arm, laterally extending projections on one end of said body portion engaging the longitudinally extended portions of the walls of said channel, and fingers adjacent the opposite end of said body portion and extending laterally therefrom engaging with opposite sides of said wiper arm at a point remote from the free end thereof.

7. In a windshield wiper, the combination with a wiper blade having a lateral aperture formed therein, of means for connecting said blade to a wiper arm having side walls forming a channel adjacent its free end portion, the ends of the walls of said channel being extended longitudinally beyond the end of the bottom portion thereof, said means comprising a connector having an elongated body portion of U-shaped cross-section and nested in said channel, a flexible laterally extending blade supporting member on one leg of said U-shaped body portion and of a length to be positioned loosely in the aperture of the wiper blade and to be bent over the U-shaped body portion of the connector to occupy a position between said body portion and the bottom of the channel formed at the free end of said wiper arm, oppositely disposed projections on one end of said connector extending laterally therefrom in substantially the plane of the bottom of said U-shaped body portion and engaging the longitudinally extended portions of the walls of said channel, and a pair of fingers adjacent the opposite end of said body portion of the connector and extending laterally therefrom into engagement with a portion of said wiper arm at a point remote from the free end thereof.

8. A device for connecting a windshield wiper blade to an actuating arm comprising a body portion, a flexible blade supporting member formed integrally with and extending laterally from said body portion, oppositely disposed arm engaging projections formed integrally with said body portion and extending laterally therefrom adjacent one end thereof, and a plurality of laterally extending arm engaging fingers formed integrally with said body portion adjacent the opposite end thereof.

9. A device for connecting a windshield wiper blade to an actuating arm comprising a body portion of substantially U-shaped cross-section, a flexible blade supporting member formed integrally with and extending laterally from one leg of said U-shaped body adjacent the central portion thereof, oppositely disposed arm engaging projections formed integrally with said body portion and extending laterally therefrom adjacent one end thereof, and a plurality of laterally extending arm engaging fingers formed integrally with said body portion adjacent the opposite end thereof.

10. A device for connecting a windshield wiper blade and a support therefor to an actuating arm, comprising a body portion including a base and integrally formed lateral walls, means for pivotally securing the body to the wiper blade support, laterally extending abutment means formed adjacent one end of the body for engaging an end portion of the wiper arm, and a plurality of flexible arm embracing fingers adjacent the opposite end of said body portion.

11. A device for connecting a windshield wiper blade and a support therefor to an actuating arm, said device comprising a body portion having adjacent one of its ends laterally extending abutment means adapted to engage an end portion of said arm, said body having adjacent its other end flexible arm-embracing means, and means associated with said body for connecting said body to said support.

12. A device for connecting a windshield wiper blade and a support therefor to an actuating arm, said device comprising a body portion having adjacent one of its ends yielding arm-embracing means and having adjacent its other end laterally extending abutment means for engaging an end portion of the wiper arm, and transverse means associated with said body and adapted to connect said body to said support.

JOHN W. ANDERSON.